(12) United States Patent
Querbes et al.

(10) Patent No.: US 12,478,260 B2
(45) Date of Patent: Nov. 25, 2025

(54) METHOD FOR CONTROLLING A ROBOTIC ARM FOR INTRA-ORAL IMAGING

(71) Applicants: Olivier Querbes, Vallesvilles (FR); Véronique Querbes-Duret, Vallesvilles (FR)

(72) Inventors: Olivier Querbes, Vallesvilles (FR); Véronique Querbes-Duret, Vallesvilles (FR)

( * ) Notice: Subject to any disclaimer, the term of this patent is extended or adjusted under 35 U.S.C. 154(b) by 357 days.

(21) Appl. No.: 18/205,918

(22) Filed: Jun. 5, 2023

(65) Prior Publication Data
US 2023/0389802 A1  Dec. 7, 2023

(30) Foreign Application Priority Data
Jun. 7, 2022  (FR) ........................................ 2205445

(51) Int. Cl.
*G06T 7/11*   (2017.01)
*A61B 5/00*   (2006.01)

(52) U.S. Cl.
CPC .............. *A61B 5/0088* (2013.01); *G06T 7/11* (2017.01); *G06T 2200/04* (2013.01); *G06T 2207/20081* (2013.01); *G06T 2207/30036* (2013.01)

(58) Field of Classification Search
CPC ................................ A61B 5/0088; G06T 7/11
See application file for complete search history.

(56) References Cited

U.S. PATENT DOCUMENTS

| | | | |
|---|---|---|---|
| 2015/0087918 A1* | 3/2015 | Vasan .................... | A61B 90/16 600/215 |
| 2019/0047145 A1 | 2/2019 | Akeel et al. | |
| 2022/0330804 A1* | 10/2022 | Shi ......................... | A61B 34/30 |
| 2023/0233278 A1* | 7/2023 | Zhao ..................... | A61B 34/30 606/1 |
| 2023/0270533 A1* | 8/2023 | Zegarelli ................ | G16H 20/13 427/2.29 |
| 2023/0389802 A1* | 12/2023 | Querbes ............... | A61B 5/0088 |

FOREIGN PATENT DOCUMENTS

FR   3111268 A1   12/2021

* cited by examiner

*Primary Examiner* — Edward Park
(74) *Attorney, Agent, or Firm* — CRGO Global; Steven M. Greenberg

(57) ABSTRACT

A method for controlling a robotic arm having an intra-oral camera, includes a step of controlling the movement of the robotic arm depending on a determined path portion, and a step of capturing images of the oral cavity by the camera, characterized in that the method further comprises a preliminary step of defining a group of intra-oral tissues to be reconstructed, a preliminary step of determining at least one portion of the path of the robotic arm depending on a starting position of the camera and of the group of tissues to be reconstructed, a step of semantically segmenting each pixel of each captured image so as to determine a group of reconstructed tissues, and after each addition of a tissue to the group of reconstructed tissues, a step of determining a new path portion depending on the group of reconstructed tissues and the group of tissues to be reconstructed.

8 Claims, 4 Drawing Sheets

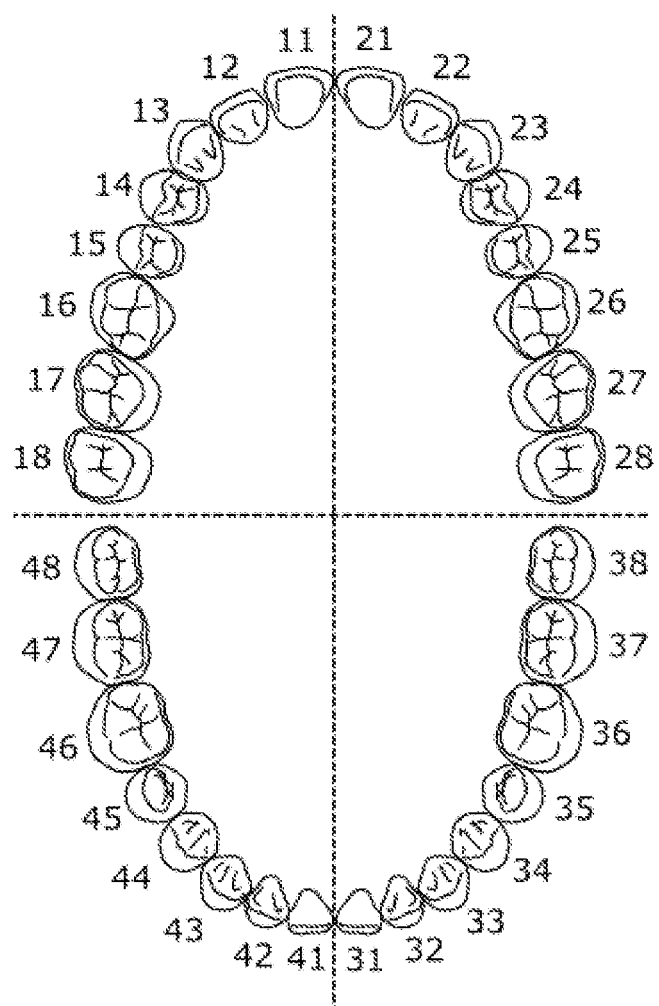
[Fig. 1]

[Fig. 2]
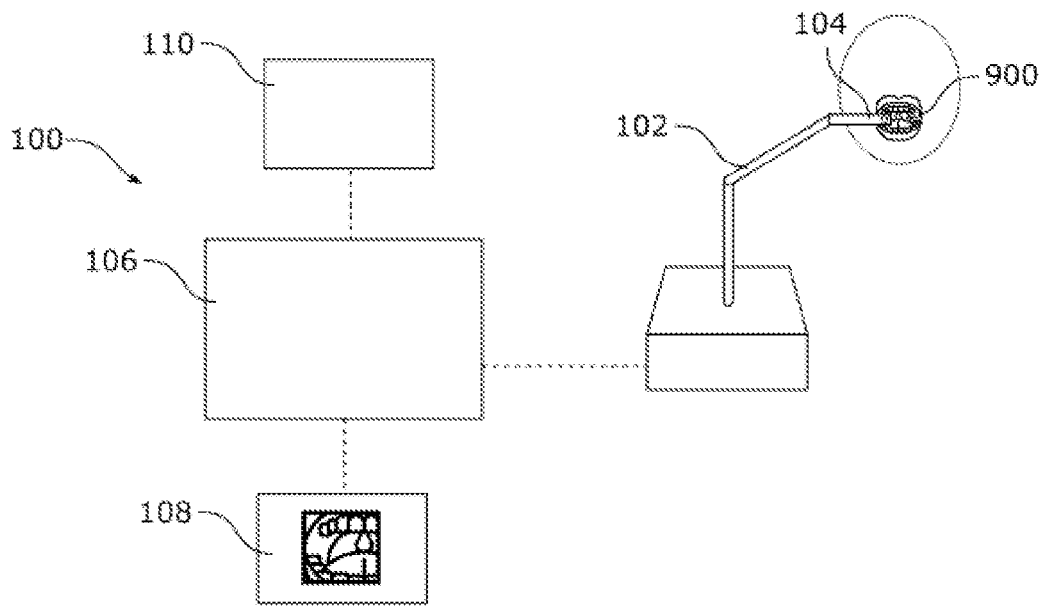
[Fig. 3]
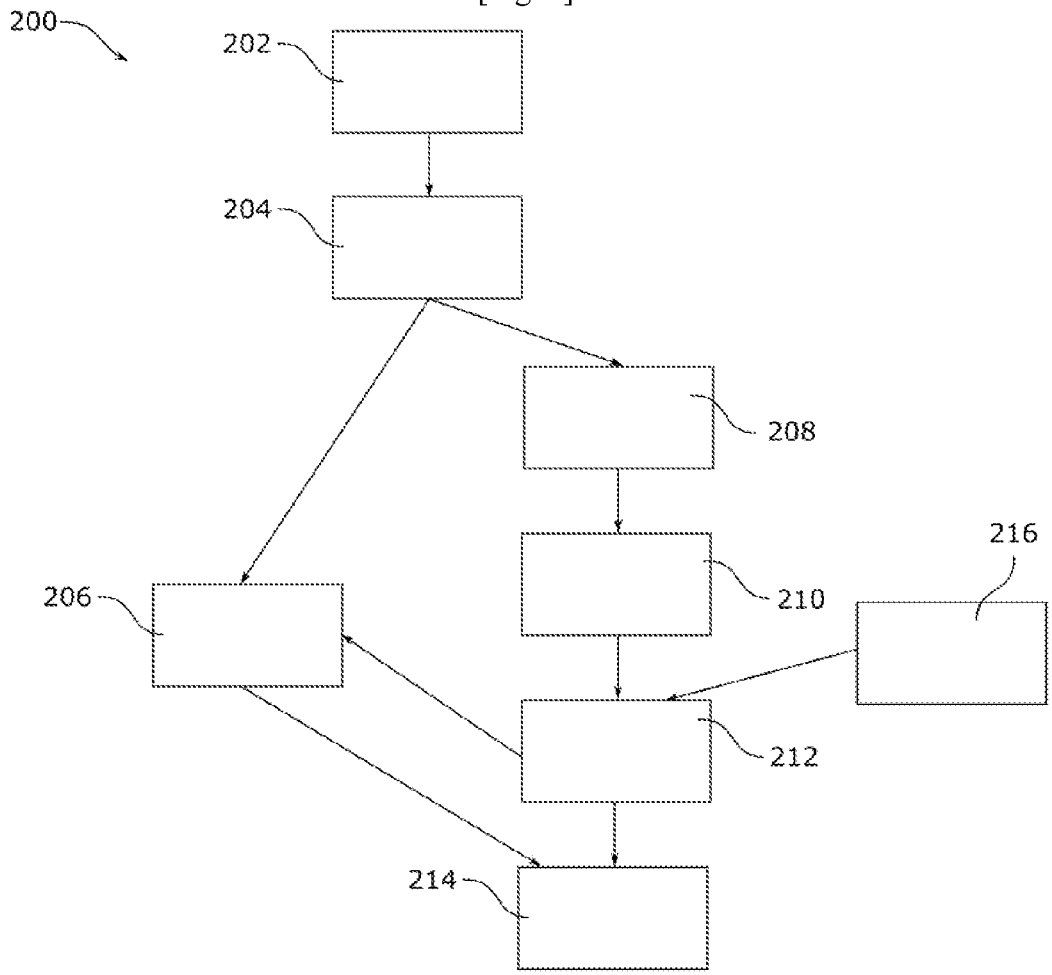

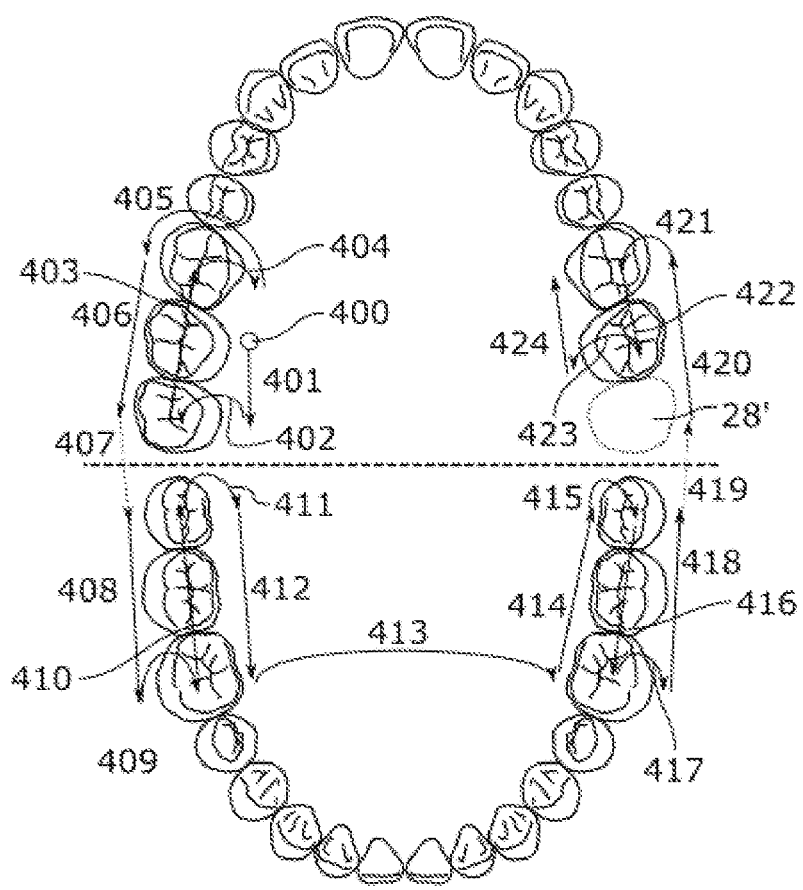
[Fig. 4]

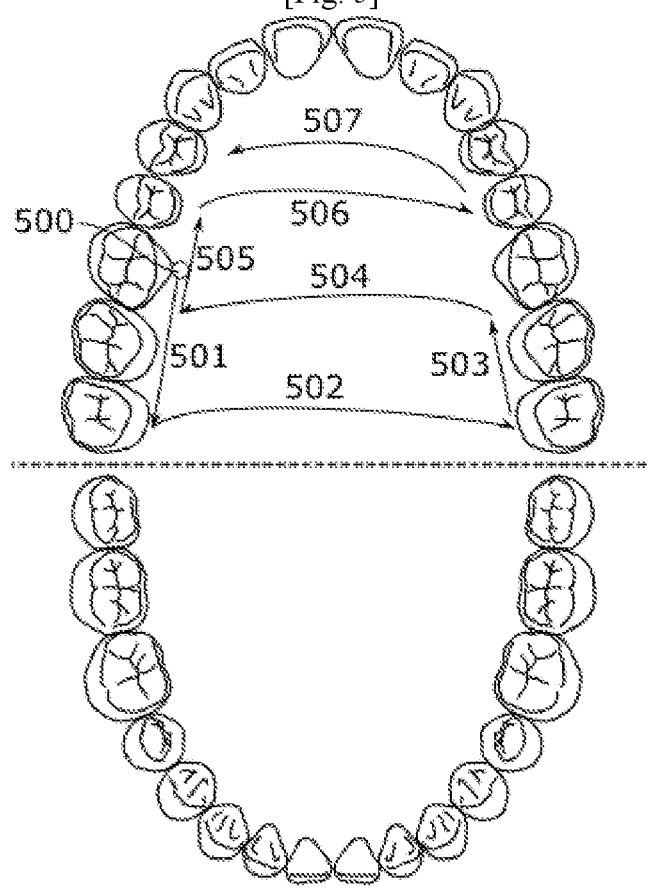
[Fig. 5]

METHOD FOR CONTROLLING A ROBOTIC ARM FOR INTRA-ORAL IMAGING

CROSS REFERENCE TO RELATED APPLICATIONS

This application claims priority under 35 U.S.C. § 119(a) to French patent application FR2205445 filed on Jun. 7, 2022, the entire teachings of which are incorporated herein by reference.

BACKGROUND OF THE INVENTION

Field of the Invention

The invention relates to a method for controlling a robotic arm for intra-oral imaging. In particular, the invention relates to a method enabling the calculation of a path for the robotic arm bearing a camera so as to capture intra-oral images in order e.g. to produce a 3D reconstruction of elements of the oral cavity in which the robotic arm is moving, in particular the reconstruction of all or part of the dental tissues of the oral cavity

Description of the Related Art

The 3D reconstruction of an oral cavity makes it possible to generate a 3D model enabling in particular identification of each of the teeth and the tissues of the oral cavity. This reconstructed oral cavity is used as a basis for various dental treatments (prosthetic, aesthetic, etc.).

Within the scope of these dental treatments, the taking of an impression of the dental arch has previously been effected by taking a physical alginate-based impression; however, this technique is gradually being replaced by digital three-dimensional reconstructions obtained by intra-oral cameras. These digital three-dimensional reconstructions of dental arches make it possible to use computer-aided design (CAD) tools, which offers the advantages of enlarging and simplifying the options for treatment and/or prosthetic design.

An intra-oral camera is a device composed of one or a plurality of optical sensors which acquire intra-oral images and convert them into a three-dimensional reconstruction of the intra-oral tissues being targeted (partial or full dental arch, palate, gingiva, isolated tooth, etc.). The images are transmitted in real time to a processing unit which calculates the corresponding three-dimensional surface and sends the current 3D reconstruction of the tissues to a screen in real time in order to show the user what he/she has correctly acquired up to that point.

Ever more intra-oral cameras are regularly coming onto the market; however, they all share the same disadvantage: a human operator must be involved to manipulate the camera in the patient's mouth in order to continually adjust its action to the real-time three-dimensional reconstruction presented, in order to correct it or complete it until the desired anatomical zone has been fully acquired.

Solutions have been proposed in order to automate the movement of the camera in the patient's mouth, in particular by generation of a path of movement in dependence upon anatomical parameters of the patient's mouth.

These solutions have various disadvantages: in the first place they are restrictive for the operator who must correctly position the robotic arm in its initial position so as to ensure that the path corresponds well to the patient.

Furthermore, the calculated path is linked to limited anatomical parameters and does not enable adaptation to any particular type of anatomy, e.g. a lost tooth or a dental anomaly such as one or more missing teeth, a supernumerary tooth, teeth or oral cavity which are of dimensions which are too different from the norm, etc.

Furthermore, these solutions are used for a full traverse of the oral cavity or at least of the dental arch and do not permit selection of portions of the dental arch, or a reverse movement to obtain better images.

Finally, these predefined paths necessitate a complete immobilisation of the patient's head because they do not make provision for possible movements, even minimal ones, of the patient's oral cavity, even if haptic sensors are generally present in order to avoid any injury.

BRIEF SUMMARY OF THE INVENTION

The inventors have thus sought a solution enabling these disadvantages to be overcome by providing an automatic control method.

The invention aims to provide a method for controlling a robotic arm including a camera configured to capture intra-oral images overcoming the above-mentioned disadvantages.

The invention aims in particular to provide, in at least one embodiment, a control method enabling the 3D reconstruction of predefined portions of the oral cavity.

The invention also aims to provide, in at least one embodiment of the invention, a control method enabling adaptation to the various anatomies present.

The invention also aims to provide, in at least one embodiment of the invention, a control method facilitating placement by a practitioner.

The invention also aims to provide, in at least one embodiment of the invention, a control method, the robotic arm path of which can be recalculated in real time.

The invention also aims to provide, in at least one embodiment of the invention, a system for controlling a robotic arm including a camera configured for the capture of intra-oral images Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

In order to do this the invention relates to a method for controlling a robotic arm including a camera configured to capture intra-oral images, the method including a step of determining at least one portion of a path of said robotic arm inside an oral cavity, a step of controlling the movement of the robotic arm in the oral cavity depending on said determined path portion, and a step of capturing images of the oral cavity by the camera of the robotic arm, characterized in that the method further includes the following steps:

- a preliminary step of defining a group of intra-oral tissues, at least one image of which must be captured by the camera, referred to as the group of tissues to be reconstructed,
- a preliminary step of determining at least one portion of the path of the robotic arm depending on a starting position of the camera and of the group of tissues to be reconstructed, a step of semantically segmenting each pixel of each captured image so as to determine a group of reconstructed tissues among the group of tissues to be reconstructed, after each addition of a tissue to the group of reconstructed tissues, a step of determining a new path portion depending on the group of reconstructed tissues and the group of tissues to be reconstructed.

A method in accordance with the invention thus enables repeated recalculation of the path (or trajectory) during control of the robot in order to adapt in real time to the oral cavity, to the anatomical features and to the possible movements of the patient, permitting a change of strategy as the reconstruction is progressing.

On the other hand, the method enables adaptation to the group of tissues to be reconstructed forming the objective targeted by the control of the robotic arm. The path is thus fixed in connection with these objectives which can vary from one patient to another, rather than aiming to achieve a complete systematic reconstruction of the oral cavity and/or of the dental arch as is the case in the prior art. The objective corresponds to the group of tissues to be reconstructed defined in the preliminary definition step: this preliminary definition step can be carried out e.g. by a human operator (manual definition), possibly assisted by a computer device (semi-automatic definition), or be entirely carried out by a computer device (automatic definition) by virtue of data which are supplied thereto. A complementary objective is to minimise the duration of the reconstruction, in particular the duration over which the camera is located in the patient's oral cavity, by implementing a path which is the most optimal possible.

The term 'path portion' is understood to mean a set value of movement making it possible to move from one tissue to be reconstructed to another tissue to be reconstructed of the group of tissues to be reconstructed in order to capture images, and the term 'path' or 'trajectory' is understood to mean the total of the portions making it possible to capture the image of all the tissues of the group of tissues to be reconstructed.

Progressively taking into account tissues already reconstructed makes it possible to offer a freedom of reconstruction, e.g. by making it possible to start the path at any position and making it possible to reconstruct only separate pieces of the oral cavity, e.g. by selecting a group of teeth which it is desired to reconstruct.

The semantic segmentation is obtained in a known manner, e.g. by a machine-learning algorithm, in particular deep learning, which makes it possible to associate a tag, a category or a label with each pixel of an image, this tag/category/label corresponding to a generally real object or element present in the image. An example of semantic segmentation implemented by a totally convolutional neural network is described e.g. in the publication "Jonathan LONG, Evan SHELHAMER, and Trevor DARRELL. Fully convolutional networks for semantic segmentation. In: Proceedings of the IEEE conference on computer vision and pattern recognition. 2015. pages 3431-3440."

The invention can also be used for the 3D reconstruction of a real 3D model, e.g. a moulding of an oral cavity, in particular of a dental arch, within the scope of existing moulding digitisation. The camera configured for the capture of intra-oral images is currently referred to as an intra-oral camera and can be of various types.

Advantageously and in accordance with the invention, the path or the path portion is determined depending on a predefined model path corresponding to at least one conventional path used by a human operator.

According to this aspect of the invention, the path is in part established by taking into account conventional paths as have been implemented by a practitioner such as a dentist. The path can thus be adapted in particular to make possible a better quality picture, taking into account the conventional paths for which the practitioner knows how to obtain good-quality images from his/her professional experience.

In particular, according to one variant of the invention the paths can be defined according to heuristic rules with respect to the current location of the robot. For example, when the robot is passing over the occlusal surface of the left molars, a path portion can be defined as a rotation of X radians on such an axis and a translation of Y mm on such an axis, until the vestibular surface of the left molars is reached. The semantic segmentation makes it possible to verify that the vestibular surface is in fact reached following the movement. During movement, the semantic segmentation can also make it possible to determine a path anomaly and to trigger a path recalculation.

The method in accordance with the invention advantageously includes a prior step of training a neural network of a control unit of the robot by reinforcement learning, said prior training step using as input data a plurality of conventional paths used by a human operator.

According to this aspect of the invention, the reinforcement learning enables the robotic arm to follow path portions or paths not defined by a human operator or not programmed in advance but to evolve according to the output data of a neural network trained on a plurality of conventional paths, thus being able to adapt to any type of intra-oral cavities, in particular on any type of dental arch. One method of reinforcement learning able to be used in this context is described e.g. in the publication "Devendra Singh CHAPLOT, Dhiraj Prakashchand GANDHI, Abhinav GUPTA, et al. Object goal navigation using goal-oriented semantic exploration. Advances in Neural Information Processing Systems, 2020, vol. 33. pages 4247-4258."

Advantageously and in accordance with the invention, the path or the path portion is determined depending on a predefined 3D model of the oral cavity.

According to this aspect of the invention, the use of a predefined 3D model can make it possible to facilitate the determination of the path. In particular, the predefined 3D model can be a simplified model, e.g. obtained with the aid of photos as proposed by the applicant in patent application WO2021245274A1.

Advantageously and in accordance with the invention, at least one path portion includes a movement until a predetermined tissue is detected by the intra-oral camera, said predetermined tissue being detected by semantic segmentation in at least one image of said intra-oral camera.

According to this aspect of the invention, the control method makes it possible to implement conditional paths, wherein the detection of a particular tissue triggers a new path calculation or the stopping of the control method. For example, the control method can enable reconstruction of a palate of the patient's oral cavity by providing a path going from one tooth to the opposing tooth on the same dental arch, and recalculation of a new path once the opposing tooth is detected by the semantic segmentation, indicating that the whole palate from tooth to tooth has been reconstructed.

Advantageously, a method in accordance with the invention includes a step of determining a new path following detection of a non-anticipated tissue by the intra-oral camera, said non-anticipated tissue being detected by semantic segmentation in at least one image of said intra-oral camera.

According to this aspect of the invention, a recalculation of the path can be effected when a non-anticipated tissue, such as a gap or a supernumerary tooth, is detected so that the originally provided path portion is no longer suitable for reconstructing the tissues of the group of tissues to be reconstructed. The step can also include removal of one or more tissues from the group of tissues to be reconstructed, e.g. by detection of a gap in the absence of a tooth.

Advantageously and in accordance with the invention, the group of tissues to be reconstructed includes at least one tissue included in the following list:
- a tooth,
- a gingiva,
- a palate,
- a dental prosthesis,
- a dental preparation,
- an implant post.

According to this aspect of the invention, the diversity of tissues to be reconstructed enables the control method for the reconstruction of different zones of the oral cavity to be implemented for different results, in particular for the generation of a 3D model of the oral cavity and/or of the dental arch. The dental preparation designates the tooth prepared to receive a dental crown. The implant post is also more commonly known as a scan body. The invention is not limited to these tissues.

The invention also relates to an imaging system including a robotic arm including a camera configured for the capture of intra-oral images, characterized in that it includes a control unit configured to receive the images captured by the intra-oral camera and to control the robotic arm according to a control method in accordance with the invention.

The invention also relates to a control method and an imaging system which are characterized in combination by all or some of the features mentioned above or below.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is an odontogram showing the numbering of human teeth according to the notational system of the World Dental Federation, FIG. 2 is a schematic view of a imaging system in accordance with one embodiment of the invention, FIG. 3 is a schematic view of a control method in accordance with one embodiment of the invention, FIG. 4 is a schematic view of a dental arch and of a path followed by the intra-oral camera during the implementation of a control method in accordance with a first embodiment of the invention, FIG. 5 is a schematic view of a dental arch and of a path followed by the intra-oral camera during the implementation of a control method in accordance with a second embodiment of the invention.

DETAILED DESCRIPTION OF THE INVENTION

In the figures, for the purposes of illustration and clarity, scales and proportions have not been strictly respected.

Furthermore, identical, similar or analogous elements are designated by the same reference signs in all the figures.

FIG. 1 is a diagram showing human adult dentition, wherein each tooth is associated with its notation according to the World Dental Federation (WDF) notation. In this notation, each tooth is referenced by two notation figures; the dentition is separated into four quadrants, and the quadrant in which the tooth is located corresponds to the first figure in the notation: quadrant 1 at the top left, quadrant 2 at the top right, quadrant 3 at the bottom right, quadrant 4 at the bottom left ("right" and "left" being understood from the point of view of the dentist looking at the dentition of a patient). The second figure in the notation indicates the corresponding tooth, in the quadrant, from 1, the central incisor, to 8, the wisdom tooth.

There is also a notation of the World Dental Federation for temporary teeth, not mentioned herein.

The control method in accordance with the invention makes it possible to control a robotic arm in order to obtain intra-oral images of tissues to be reconstructed, e.g. teeth to be reconstructed.

FIG. 2 schematically illustrates an imaging system 100 in accordance with one embodiment of the invention, in particular configured to implement a control method in accordance with one embodiment of the invention.

The imaging system 100 includes a robotic arm 102, e.g. a robotic arm of the type with six axes, including at one of its ends a camera 104 configured for the capture of intra-oral images in the intra-oral cavity 900 of a patient, in other words an intra-oral camera. The intra-oral camera 104 can be a camera as currently used on the market for a manual intra-oral scan, and makes possible the real time acquisition of raw data relating to the dental tissues, these data being able to be (depending on the type of camera) 2D images, partial 3D reconstructions, or the like.

The imaging system 100 also includes a control unit 106 enabling on the one hand the steering and the automatic control of the robotic arm 102, the reception of the raw data from the intra-oral camera 104, and the processing of these raw data.

The processing of the raw data can be e.g. a combination in real time in order to produce an incremental real time 3D model which can be monochromatic or colour. An optional step makes possible the application of digital processing to the last incremental 3D model in order to produce a final, highly precise, 3D reconstruction.

According to certain embodiments, the raw or processed data can be transmitted to a display system 108 such as a display screen, enabling a visual check of the progress of the image capture and of the control of the robotic arm 102.

The raw digital data or digital data resulting from the processing by the control unit are stored in a memory storage unit 110.

FIG. 3 schematically shows a control method 200 in accordance with one embodiment of the invention.

The method includes in particular the following steps:
- a preliminary step 202 of defining a group of intra-oral tissues, at least one image of which must be captured by the camera, referred to as the group of tissues to be reconstructed (alternatively called the set of tissues to be reconstructed),
- a preliminary step 204 of determining at least one portion of the path of the robotic arm depending on a starting position of the camera and of the group of tissues to be reconstructed, a step 206 of controlling the movement of the robotic arm in the oral cavity depending on said determined path portion, a step 208 of capturing images of the oral cavity by the camera of the robotic arm, a step 210 of semantically segmenting each pixel of each captured image so as to determine a group of reconstructed tissues (alternatively called the set of reconstructed tissues) among the group of tissues to be reconstructed, after each addition of a tissue to the group of reconstructed tissues, a step 212 of determining a new path portion depending on the group of reconstructed tissues and the group of tissues to be reconstructed.

When the group of tissues have been reconstructed, a final step 214 of the method is implemented, which makes possible e.g. the withdrawal of the oral camera from the patient's oral cavity.

Step 206 of controlling the robotic arm is effected in parallel with the image capture and segmentation, depending on said at least one path portion determined by the preliminary step 204 depending on the starting position, or depending on the new path portion determined in step 212.

The control method can determine a complete path in the preliminary step 204 of determining at least one portion of the path and/or in each step 212 of determining a new path portion, the path thus being able to be optimised in order to be of minimal duration. However, any determined complete path can be modified as the control method progresses during a new step 212 of determining a new path portion.

The determination of a new path portion is effected by virtue of the available data enabling the current status to be characterized, in particular the current position of the camera, the group of reconstructed tissues, the group of tissues to be reconstructed, a predefined 3D model of the oral cavity, etc.

If the control unit implementing the control method 200 uses a neural network, the control method 200 can include a preliminary step 216 of training the neural network based on data from paths implemented by experienced human operators on a large number of different dental arches. The neural network thus trained enables the implementation of step 212 of determining the path portion(s) depending on the current status of the method.

According to another embodiment of the invention, the control step 206 is effected by the application of heuristic rules predetermined and adjusted depending on the current status.

FIGS. 4 and 5 schematically illustrate examples of paths which can be followed by the intra-oral camera installed on the robotic arm controlled by the control unit, following the control method in accordance with the invention.

The illustration of the dental arch is analogous to that illustrated in FIG. 1, and the teeth are identified by their reference according to the notation of the World Dental Federation, illustrated in this FIG. 1, and are not illustrated in FIGS. 4 and 5 for reasons of clarity.

FIG. 4 illustrates a first path including a plurality of phases representing path portions, the objective of this path being e.g. the reconstruction of the tissues forming all the molars of the dental arch, of a patient or of a physical 3D model. All of the tissues of the molars thus form the group of tissues to be reconstructed and this group is defined automatically by a computer device, manually by a human operator or semi-automatically by a human operator assisted by an computer device.

The robotic arm or a human operator guides the camera towards a starting position 400, which may be any position. At that location, the starting position is at the palatal surface of the second right molar 17. The image capture begins and the camera follows a first path portion 401 at the palatal surfaces as far as the molar 18. The camera then follows a second path portion 402 until reaching the occlusal surface of the molar 18, then a third path portion 403 in order to scan the occlusal surfaces of the molars 18, 17 and 16. Since the palatal surface of the molar 16 does not form part of the reconstructed tissues but forms part of the tissues to be reconstructed, a fourth path portion 404 is followed by the camera until it reaches this surface.

The camera then follows the following paths:

a fifth path portion 405 until reaching the vestibular surface of the molar 16, a sixth path portion 406 in order to capture the images of the vestibular surfaces of the molars until reaching the molar 18, a seventh path portion 407 until reaching the mandibular teeth, an eighth path portion 408 in order to capture the images of the vestibular surfaces of the molars 48, 47 and 46, a ninth path portion 409 until reaching the occlusal surface of the molar 46, a tenth path portion 410 in order to capture the images of the occlusal surfaces of the molars 46, 47 and 48, an eleventh path portion 411 in order to reach the lingual surface of the molar 48, a twelfth path portion 412 in order to capture the images of the lingual surfaces of the molars 48, 47 and 46, a thirteenth path portion 413 until reaching the lingual surface of the molar 36, a fourteenth path portion 414 in order to capture the images of the lingual surfaces of the molars 36, 37 and 38, a fifteenth path portion 415 until reaching the occlusal surface of the molar 38, a sixteenth path portion 416 in order to capture the images of the occlusal surfaces of the molars 38, 37 and 36, a seventeenth path portion 417 until reaching the vestibular surface of the molar 36, an eighteenth path portion 418 in order to capture the images of the vestibular surfaces of the molars until reaching the molar 38, a nineteenth path portion 419 until reaching the maxillary teeth.

Upon arriving at the location 28' of the molar 28 the control method detects the absence of this molar. The tissues of the molar 28 can thus be removed from the group of tissues to be reconstructed and the path or the following path portion can be recalculated. In particular, a twentieth path portion 420 is followed in order to capture the images of the vestibular surfaces of the molars 27 and 28, a twenty-first path portion 421 makes it possible to reach the occlusal surface of the molar 26, a twenty-second path portion 422 makes it possible to capture the images of the occlusal surfaces of the molars 26 and 27. Since the molar 28 is absent, the twenty-third path portion 423 makes it possible to reach the palatal surface of the molar 27 and the twenty-fourth portion 424 makes it possible to capture the images of the palatal surfaces of the molars 27 and 26.

The method then reaches a final step in which the intra-oral camera is withdrawn from the oral cavity.

FIG. 5 illustrates a second path including a plurality of phases representing path portions, the objective of this path being e.g. the reconstruction of the palate of a patient or of a physical 3D model.

The robotic arm or a human operator guides the camera towards a starting position 500, which may be any position. At that location, the starting position is at the palatal surface of the first right molar 16. The image capture begins and the camera follows a first path portion 501 at the palatal surfaces as far as the molar 18. The camera then follows a second path portion 502 in order to capture images of the palate until reaching the palatal surface of the molar 28 so as to traverse the palate across its width. The detection of this palatal surface by semantic segmentation makes it possible to validate that the whole width of the palate has been captured.

The camera then follows a third path portion 503 so as to be placed at the palatal surfaces of the molars 26 and 27 and a fourth path portion 504 makes it possible to capture new images of the palate until reaching the right maxillary molars 17 and 18. The camera then moves along a fifth path portion 505 so as to reach the palatal surface of the premolar 15 and to traverse the width of the palate again in a sixth path portion 506 until reaching the palatal surface of the premolar 24, then to follow a seventh path portion 507 in order to terminate the capturing of the palate at the canines and maxillary incisors. With each traverse of the width of the palate, the detection of the teeth makes it possible to ensure that the width of the palate has indeed been crossed.

The method then reaches a final step in which the intra-oral camera is withdrawn from the oral cavity.

This path is purely for illustrative purposes and the number of transverse crossings necessary for the capturing of the images of the whole palate can be higher or lower, e.g. depending on the size of the palate or the field of view of the camera.

Similarly, other objectives can be implemented, in particular the group of tissues to be reconstructed may be the group of tissues of the dental arch so as to effect a full reconstruction of the dental arch.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method for controlling a robotic arm comprising a camera configured to capture intra-oral images, the method comprising a step of determining at least one portion of a path of said robotic arm inside an oral cavity, a step of controlling the movement of the robotic arm in the oral cavity depending on said determined path portion, and a step of capturing images of the oral cavity by the camera of the robotic arm, wherein the method further comprises the following steps:
   a preliminary step of defining a group of intra-oral tissues, at least one image of which must be captured by the camera, referred to as the group of tissues to be reconstructed,
   a preliminary step of determining at least one portion of the path of the robotic arm depending on a starting position of the camera and of the group of tissues to be reconstructed,
   a step of semantically segmenting each pixel of each captured image so as to determine a group of reconstructed tissues among the group of tissues to be reconstructed, and
   after each addition of a tissue to the group of reconstructed tissues, a step of determining a new path portion depending on the group of reconstructed tissues and the group of tissues to be reconstructed.

2. The method as claimed in claim 1, wherein the path or the path portion is determined depending on a predefined model path corresponding to at least one conventional path used by a human operator.

3. The method as claimed in claim 1, further comprising a prior step of training a neural network of a control unit of the robot by reinforcement learning, said prior training step using as input data a plurality of conventional paths used by a human operator.

4. The method as claimed in claim 1, wherein the path or the path portion is determined depending on a predefined 3D model of the oral cavity.

5. The method as claimed in claim 1, wherein at least one path portion comprises a movement until a predetermined tissue is detected by the intra-oral camera, said predetermined tissue being detected by semantic segmentation in at least one image of said intra-oral camera.

6. The method as claimed in claim 1, further comprising a step of determining a new path following detection of a non-anticipated tissue by the intra-oral camera, said non-anticipated tissue being detected by semantic segmentation in at least one image of said intra-oral camera.

7. The method as claimed in claim 1, wherein the group of tissues to be reconstructed comprises at least one tissue selected from the group consisting of:
   a tooth,
   a gingiva,
   a palate,
   a dental prosthesis,
   a dental preparation,
   an implant post.

8. An imaging system comprising a robotic arm comprising a camera configured for the capture of intra-oral images, the system comprising a control unit processor configured to receive the images captured by the intra-oral camera and to control the robotic arm according to a control method comprising: a preliminary step of defining a group of intra-oral tissues, at least one image of which must be captured by the camera, referred to as the group of tissues to be reconstructed, a preliminary step of determining at least one portion of the path of the robotic arm depending on a starting position of the camera and of the group of tissues to be reconstructed, a step of semantically segmenting each pixel of each captured image so as to determine a group of reconstructed tissues among the group of tissues to be reconstructed, and after each addition of a tissue to the group of reconstructed tissues, a step of determining a new path portion depending on the group of reconstructed tissues and the group of tissues to be reconstructed.

\* \* \* \* \*